United States Patent
Kubota et al.

(10) Patent No.: US 7,910,237 B2
(45) Date of Patent: Mar. 22, 2011

(54) POLYMER ELECTROLYTE MEMBRANE AND METHOD FOR PRODUCING POLYMER ELECTROLYTE MEMBRANE

(75) Inventors: Makoto Kubota, Yokohama (JP); Motokazu Kobayashi, Yokohama (JP); Keiko Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/514,429

(22) PCT Filed: Oct. 31, 2007

(86) PCT No.: PCT/JP2007/071591
§ 371 (c)(1),
(2), (4) Date: May 11, 2009

(87) PCT Pub. No.: WO2008/059734
PCT Pub. Date: May 22, 2008

(65) Prior Publication Data
US 2010/0040928 A1  Feb. 18, 2010

(30) Foreign Application Priority Data
Nov. 13, 2006  (JP) .................................. 2006-306958

(51) Int. Cl.
*H01M 8/10* (2006.01)
(52) U.S. Cl. .......... 429/33; 429/492; 429/479; 429/491; 429/493; 429/409; 429/483; 427/115; 427/496
(58) Field of Classification Search .................. None
See application file for complete search history.

(56) References Cited

U.S. PATENT DOCUMENTS

| | | | | |
|---|---|---|---|---|
| 4,797,187 | A * | 1/1989 | Davis et al. | 427/58 |
| 2005/0118479 | A1 | 6/2005 | Yamaguchi et al. | |
| 2005/0164063 | A1 * | 7/2005 | Wariishi et al. | 429/33 |
| 2005/0186480 | A1 * | 8/2005 | Aihara | 429/303 |
| 2007/0077478 | A1 * | 4/2007 | Nguyen et al. | 429/33 |

FOREIGN PATENT DOCUMENTS

| | | |
|---|---|---|
| CA | 2482061 A | 3/2005 |
| JP | 2004-349034 A | 1/1990 |
| JP | H02-111440 A | 4/1990 |
| JP | 2000-003712 A | 1/2000 |
| JP | 2003-263998 A | 9/2003 |
| JP | 2004-143388 A | 5/2004 |

(Continued)

OTHER PUBLICATIONS

International Preliminary Report on Patentability (Chapter I of the PCT).

(Continued)

*Primary Examiner* — Ula C. Ruddock
*Assistant Examiner* — Alix Echelmeyer
(74) *Attorney, Agent, or Firm* — Canon U.S.A., Inc., IP Division

(57) ABSTRACT

The present invention can provide a polymer electrolyte membrane having power generation characteristics with a high output and long life and a polymer electrolyte fuel cell using the same. The present invention provides a polymer electrolyte membrane having a porous polymer film and a proton conducting component present in a hole of the porous polymer film, characterized in that the proton conducting component has a compound having a proton conducting group and a bicyclo ring structure.

11 Claims, 1 Drawing Sheet

FOREIGN PATENT DOCUMENTS

| | | |
|---|---|---|
| JP | 2004-171994 A | 6/2004 |
| JP | 2004-253336 A | 9/2004 |
| JP | 2005-120198 A | 5/2005 |
| JP | 2005-166557 A | 6/2005 |
| JP | 2005-222736 A | 8/2005 |

OTHER PUBLICATIONS

Database WPI Week 200540, Thomson Scientific, London, GB; AN 2005-388696, xP002599953 & JP 2005 120198 A (JSR C0RP) May 12, 2005 abstract.

* cited by examiner

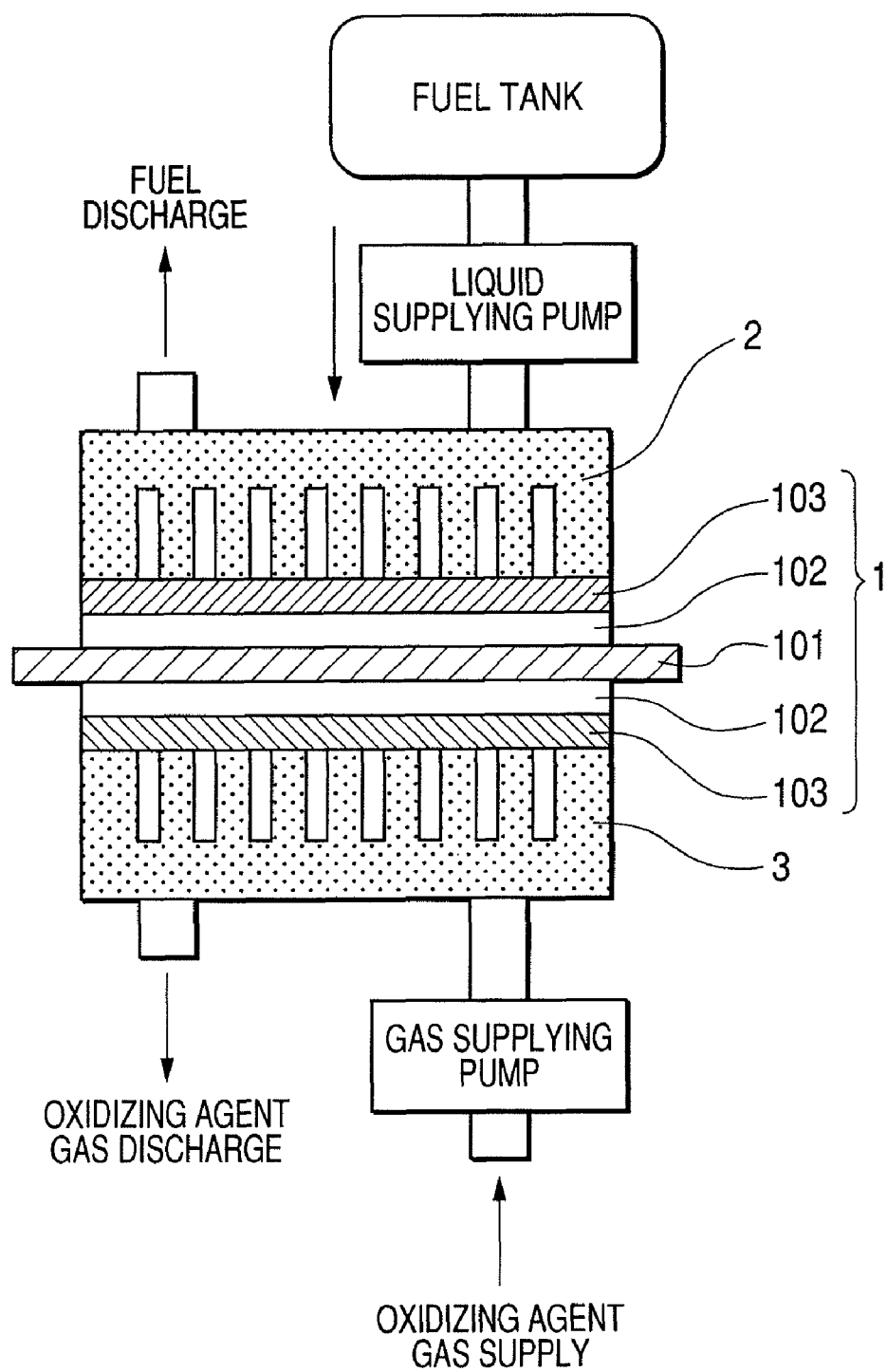

POLYMER ELECTROLYTE MEMBRANE AND METHOD FOR PRODUCING POLYMER ELECTROLYTE MEMBRANE

TECHNICAL FIELD

The present invention relates to a polymer electrolyte membrane, a method for producing a polymer electrolyte membrane, a membrane electrode assembly, and a polymer electrolyte fuel cell. Particularly, the present invention relates to a polymer electrolyte membrane improved in power generation efficiency by improving the adhesion between a porous film and a proton conducting component as members constituting the polymer electrolyte membrane.

BACKGROUND ART

Perfluorosulfonic acid membranes typified by DuPont Nafion (registered trademark) have been used widely as electrolyte membranes for polymer electrolyte fuel cells. However, these perfluorosulfonic acid membranes present problems such as low proton conductivity at insufficient humidity, low power generation efficiency attributed to the easy permeation of liquid fuels used, such as alcohols, and a large dimensional change during swelling.

To solve these problems, studies have been made on an electrolyte membrane obtained by filling a proton conducting polymer into holes of an insulating porous film. This electrolyte membrane, which uses the insulating porous film as a base material, has advantages that the electrolyte membrane can suppress a dimensional change attributed to moisture and can suppress alcohol permeability even in a moisture state.

As an example of such a polymer electrolyte membrane, Japanese Patent Application Laid-Open No. 2003-263998 discloses an electrolyte membrane obtained by filling 2-acrylamido-2-methylpropanesulfonic acid and a crosslinking agent into a polyimide porous film and performing polymerization.

Alternatively, as another example of a polymer electrolyte membrane, Japanese Patent Application Laid-Open No. 2004-253336 discloses an electrolyte membrane obtained by filling 2-methacrylamido-2-methylpropanesulfonic acid and a crosslinking agent into a crosslinked polyethylene film and performing polymerization.

However, the polymer electrolyte membranes prepared by the production methods described in Japanese Patent Application Laid-Open Nos. 2003-263998 and 2004-253336 are considered to have insufficient interface contact between the lipophilic porous polymer film and the hydrophilic proton conducting component (proton conducting filling). Therefore, the proton conducting component is not sufficiently fixed in holes of the polymer film even after polymerization. Thus, it is expected that satisfactory output characteristics are not obtained due to the increased internal resistance of a cell and a reduced output in a continuous run.

Alternatively, Japanese Patent Application Laid-Open No. 2005-120198 discloses, as an independent membrane, an electrolyte membrane including a bicyclo compound. This document discloses dicyclopentanyl and dicyclopentenyl as examples of the bicyclo compound.

However, the polymer electrolyte membrane described in Japanese Patent Application Laid-Open No. 2005-120198 is an independent membrane. Therefore, this electrolyte membrane probably presents problems such as a large dimensional change during swelling.

Thus, the present invention improves the interface contact between a porous polymer film and a proton conducting component and enhances the fixation efficiency of a filling. As a result, the present invention provides a polymer electrolyte membrane having power generation characteristics with a high output and long life, a method for producing the same, a membrane electrode assembly, and a polymer electrolyte fuel cell.

DISCLOSURE OF THE INVENTION

The present invention provides a polymer electrolyte membrane comprising a porous polymer film and a proton conducting component present in a hole of the porous polymer film, wherein the proton conducting component comprises a compound having a proton conducting group and a bicyclo ring structure.

The compound is preferably a copolymer of a compound having a bicyclo ring structure and a compound having a proton conducting group.

The proton conducting group is preferably a sulfonic acid group and/or a phosphoric acid group.

The bicyclo ring structure is preferably a dicyclopentenyl group or a dicyclopentanyl group.

It is preferred that the compound having a proton conducting group and a bicyclo ring structure also have a heterocyclic structure.

The heterocyclic structure is preferably a morpholine ring structure.

The porous polymer film is preferably a membrane comprising a polyimide-based polymer.

According to an alternative aspect, the present invention provides a membrane electrode assembly comprising the polymer electrolyte membrane and an electrode.

According to an alternative aspect, the present invention provides a polymer electrolyte fuel cell comprising the membrane electrode assembly and an electrode for transferring an electric current generated in the membrane electrode assembly to the outside.

According to an alternative aspect, the present invention provides a method for producing a polymer electrolyte membrane, comprising the steps of filling a mixture of a compound having a proton conducting group and a compound having a bicyclo ring structure into a hole of a porous polymer film and polymerizing the compound having a proton conducting group and the compound having a bicyclo ring structure.

It is preferred that each of the compound having a proton conducting group and the compound having a bicyclo ring structure has a polymerizable group.

The bicyclo ring structure is preferably a dicyclopentenyl group or a dicyclopentanyl group.

The polymerization is preferably performed by electron beam irradiation.

According to an alternative aspect, the present invention provides a polymer electrolyte membrane comprising a porous polymer film and a proton conducting copolymer filled in a hole of the porous polymer film, wherein the proton conducting copolymer has a proton conducting group and a bicycle ring structure.

The bicycle ring structure is preferably a dicyclopentenyl group or a dicyclopentanyl group.

It is preferred that the proton conducting copolymer also has a heterocyclic structure.

The heterocyclic structure is preferably a morpholine ring structure.

The porous polymer film is preferably a membrane comprising a polyimide-based polymer.

The present invention can provide a polymer electrolyte membrane having power generation characteristics with a high output and long life, a method for producing the same, a membrane electrode assembly, and a polymer electrolyte fuel cell.

Further feature of the present invention will become apparent from the following description of exemplary embodiments with reference to the attached drawing.

BRIEF DESCRIPTION OF THE DRAWING

FIG. 1 is a cross-sectional schematic diagram illustrating the constitution of one embodiment of a polymer electrolyte fuel cell of the present invention.

BEST MODES FOR CARRYING OUT THE INVENTION

Hereinafter, modes for carrying out the invention will be described.
(Characteristics of Polymer Electrolyte Membrane of the Present Invention)

The polymer electrolyte membrane according to the present invention includes a porous polymer film and a proton conducting component present in a hole of the porous polymer film.
Regarding Porous Polymer Film In the present invention, the porous polymer film refers to a polymer film having a number of fine holes. These holes are not independent and can be connected reasonably to each other to form a passage though which a gas or liquid can permeate from one side of the membrane to the other side thereof. However, if the gas or liquid can permeate therethrough without resistance, fuel crossover is caused, leading to reduction in performance. Therefore, these holes can be connected nonlinearly so as to increase the substantial distance of permeation. The degree of this permeation can be controlled by the thickness of the porous polymer film and the size of the hole.

In the present invention, materials for the porous polymer film are not particularly limited. Considering that the porous polymer film is used in wet environments, polymer materials that are insoluble in water and do not swell in water can be used. Specifically, a variety of resin materials may be used, such as polyimide-based (e.g., UPILEX manufactured by UBE INDUSTRIES, LTD.), polytetrafluoroethylene-based (e.g., a porous PTFE membrane manufactured by NITTO DENKO CORP.), polyacrylonitrile-based, polyamide-based, polyamide-imide-based, and polyolefin-based materials. In this context, the "polyimide-based resin" refers to a resin made of polyimide or a polyimide derivative. The same holds true for the other materials.

Moreover, methanol may be selected as a fuel for a polymer electrolyte fuel cell of the present invention. In such a case, the porous polymer film is selected from materials that are insoluble in methanol and water and do not substantially swell in methanol and water. Of the materials described above, the polyimide-based polymer is most excellent in insolubility in methanol and water, physical strength, and chemical stability.

The thickness and porosity of the porous polymer film are not particularly limited and are selected according to materials thereof, the strength of the polymer electrolyte membrane of interest, and the characteristics of a polymer electrolyte fuel cell of interest. However, a possible suitable thickness is 15 μm or larger to 150 μm or smaller from the viewpoint of use of a general polymer electrolyte fuel cell. The porous polymer film having a thickness smaller than 15 μm might not maintain sufficient strength during the fabrication of a membrane electrode assembly or when used as a polymer electrolyte fuel cell. On the other hand, the porous polymer film with a thickness larger than 150 μm might result in reduced power generation efficiency due to too long distance traveled by protons.

Moreover, it is desired that the average porosity of the porous polymer film should be 30% or larger to 90% or smaller in terms of a volume. The porous polymer film having an average porosity smaller than 30% might result in reduced power generation efficiency due to decreased areas where the proton conducting component can be present. By contrast, the porous polymer film having an average porosity larger than 90% might lead to insufficient strength of the polymer electrolyte membrane. In this context, the average porosity refers to a rate of the volume of holes occupying the total volume of the porous polymer film. The average porosity is calculated by a method including calculating the apparent specific gravity of the porous polymer film from the weight and volume of the porous polymer film and then calculating the average porosity according to the equation 1−(the apparent specific gravity of the porous polymer film/the specific gravity of the polymer material itself)×100.
Regarding Proton Conducting Component The proton conducting component is present in a hole of the porous polymer film. In other words, the proton conducting component is filled in a hole of the porous polymer film. In this context, the phrase "the proton conducting component is present in a hole of a porous polymer film 1" does not necessarily mean that all the proton conducting components must be present within spaces formed in the porous polymer film 1 and can mean that most of the proton conducting components are present within the spaces.

The proton conducting component is a polymer material having proton conductivity and includes a compound having both of a proton conducting group and a bicyclo ring structure.

The proton conducting group carried by the compound that constitutes the proton conducting component refers to a functional group having proton conductivity. Examples of such a functional group include sulfonic acid, sulfinic acid, carboxylic acid, phosphonic acid, phosphoric acid, phosphinic acid, and boronic acid groups. Of these functional groups, the sulfonic acid group and/or the phosphoric acid group can be used as the proton conducting group included in the polymer electrolyte membrane of the present invention. Both of the sulfonic acid group and the phosphoric acid group have a high degree of acid dissociation and therefore have high effect of improving proton transport efficiency.

The compound having a bicyclo ring structure is excellent in the compatibility of the bicyclo ring structure portion with a nonpolar polymer. Therefore, the presence of the bicyclo ring structure has the effect of enhancing the filling factor (and fixation strength) of the proton conducting component into the porous polymer film. Specifically, the compound having a bicyclo ring structure has favorable adhesion to the surface of a hole of the porous polymer film. Thus, the proton conducting component including the compound having a proton conducting group and a bicyclo ring structure has favorable adhesion to the porous polymer film. In this case, the adhesion between the proton conducting component and the porous polymer film can be achieved by the physical or chemical adsorption of the proton conducting component in the porous polymer film at such strength as not to allow the proton conducting component to run out during power generation reaction. Moreover, the proton conducting component can bond chemically to the porous polymer film.

In this context, in the present invention, the bicyclo ring structure refers to any bicyclic molecular structure free from a free spiro bond. In this context, the spiro linkage refers to a linkage through one atom shared by certain two rings. The free spiro bond means that the spiro linkage is only one bond in the two rings. Polycyclic structures such as tricyclic (tricyclo) or tetracyclic (tetracyclo) structures also contain a bicyclo ring structure. Therefore, these polycyclic structures are also encompassed by the bicyclo ring structure of the present invention.

Examples of functional groups having such a bicyclo ring structure include dicyclopentenyl (tricyclo[$5.2.1.0^{2,6}$]-3-decenyl), dicyclopentanyl (tricyclo[$5.2.1.0^{2,6}$]decanyl), adamantyl (tricyclo[$3.3.1.1^{3,7}$]decanyl), norbornyl (bicyclo[2.2.1]hept-2-yl), bornyl(endo-1,7,7-trimethylbicyclo[2.2.1]hept-2-yl), isobornyl(exo-1,7,7-trimethylbicyclo[2.2.1]hept-2-yl), and tetracyclododecanyl groups and substitution products thereof.

Of these functional groups, the dicyclopentenyl group or dicyclopentanyl group is well compatible with or adheres to both of a polar component (e.g., the proton conducting group) and a nonpolar component (e.g., the polyimide-based polymer). Therefore, these groups can be used particularly as the bicyclo ring structure of the present invention.

Moreover, the compound that constitutes the proton conducting component can be a proton conducting copolymer. The proton conducting group and the bicyclo ring structure may be present in different monomer units or may be present in the same monomer unit. When the compound is a copolymer, the proton conducting group and the bicyclo ring structure can be present in different monomer units. In this context, the copolymer refers to a polymer having at least two or more monomer units. The copolymer may be a chain polymer obtained by addition polymerization or may be a highly branched, network polymer obtained by crosslinking reaction or graft polymerization.

Moreover, the content of the proton conducting group is not particularly limited. The molecular weight of the proton conducting component per equivalent of the proton conducting group can be 1000 or smaller from the viewpoint of keeping the proton conductivity of the polymer electrolyte membrane high.

Likewise, the content of the bicyclo ring structure is not particularly limited. The content can be 0.01 equivalents or higher to 1 equivalent or lower, particularly 0.01 equivalents or higher to 0.5 equivalents or lower, relative to 1 equivalent of the proton conducting group. The bicyclo ring structure present in a ratio less than 0.01 equivalents to the proton conducting group might not produce the effect of improving the adhesion between the proton conducting component and the porous polymer film. By contrast, the bicyclo ring structure present in a ratio exceeding 1 equivalent to the proton conducting group might inhibit the proton conducting effect of the polymer electrolyte membrane.

In the present invention, the proton conducting component can also have a heterocyclic structure, in addition to the proton conducting group and the bicyclo ring structure. The heterocyclic structure is stabilized through auto-stacking in a hole of the porous polymer film. Therefore, the proton conducting component having the heterocyclic structure has the effect of enhancing the fixation strength of the proton conducting component into the porous polymer film. The content of the heterocyclic structure is not particularly limited. The content can be 0.05 equivalents or higher to 0.5 equivalents or lower, particularly 0.07 equivalents or higher to 0.5 equivalents or lower, relative to 1 equivalent of the proton conducting group. The heterocyclic structure present in a ratio less than 0.05 equivalents to the proton conducting group might not produce the effect of enhancing the fixation strength through auto-stacking. By contrast, the heterocyclic structure present in a ratio exceeding 0.5 equivalents to the proton conducting group might inhibit the proton conducting effect of the polymer electrolyte membrane.

The type of such a heterocyclic structure is not particularly limited. Examples thereof can include ring structures such as morpholine, phthalimide, pyrazolidine, and caprolactam rings. Among these ring structures, the morpholine ring structure can be used particularly. When a polyimide-based polymer is selected as the porous polymer film, the morpholine ring structure is also stacked with an imide ring. Therefore, the fixation effect is particularly enhanced.

[Method for Producing Polymer Electrolyte Membrane According to the Present Invention]

The method for producing a polymer electrolyte membrane according to the present invention includes the steps of:
(1) filling a mixture of at least a compound having a proton conducting group and a compound having a bicyclo ring structure into a hole of a porous polymer film; and
(2) polymerizing the compounds in the mixture.

Regarding Step (1)

The type of the compound having a proton conducting group that constitutes the mixture is not particularly limited. To enhance the power generation efficiency of a membrane electrode assembly, the compound used can have a sulfonic acid group or a phosphoric acid group as the proton conducting group and can have a high sulfonic acid group or phosphoric acid group content. For example, the molecular weight of the compound per proton conducting functional group can be 500 or lower. Moreover, the compound can be a monomer or an oligomer.

The type of the compound having a bicyclo ring structure that constitutes the mixture is not particularly limited. To improve the interface contact, the compound used can have a high bicyclo ring structure content. For example, the molecular weight of the compound per bicyclo ring structure can be 500 or lower. Of functional groups having a bicyclo ring structure, a dicyclopentenyl group or dicyclopentanyl group is particularly excellent in compatibility with other components and adhesion. Therefore, these groups can be used particularly as the bicyclo ring structure included in the mixture of the present invention. Furthermore, the compound can also be a monomer or an oligomer.

Moreover, the compound having a proton conducting group and the compound having a bicyclo ring structure may be different compounds or may be the same compound. When the same compound is used, the compound having a proton conducting group and a bicyclo ring structure constitutes the mixture. Alternatively, when different compounds are used, the mixing ratio between the compound having a proton conducting group (which can be a sulfonic acid group and/or a phosphoric acid group) (referred to as (A)) and the compound having a bicyclo ring structure (referred to as (B)) in the mixture can be A:B=2 to 100:1 in terms of the ratio between the number of the proton conducting group and the number of the bicyclo structure.

Each of the compound having a proton conducting group and the compound having a bicyclo ring structure can have a polymerizable group. Particularly at the step (2), polymerization may be performed by electron beam irradiation. In such a case, the polymerizable group can be a functional group having an activity to electron beams.

The functional group having an activity to electron beam irradiation that serves as the polymerizable group can further secure the chemical bond between the compounds or between the compound and the porous polymer film in polymerization performed at the step (2). Examples of such a functional group having an activity to electron beam irradiation include unsaturated bonds such as double bonds and triple bonds. Among these functional groups, particularly, methacrylic acid, acrylic acid, vinyl, and styrene groups are functional groups having a high activity to electron beam irradiation and can therefore be used particularly.

Of the compounds having a proton conducting group, examples of a compound having a functional group having an activity to electron beams and having a sulfonic acid group can include vinylsulfonic acid, allylsulfonic acid, styrenesulfonic acid, sulfobutyl methacrylates, sulfopropyl methacrylates, 2-acrylamido-2-methylpropanesulfonic acid, sulfobenzene methacrylates, and sulfobenzyl methacrylates.

Monomers obtained by introducing fluorine into these monomers may also be used. These monomers may be mixed and used in combination of two or more of them. Alternatively, a (meth) acrylic ester derivative having a phosphoric ester group in the side chain can be used as a suitable compound having a phosphoric acid group and having a functional group having an activity to electron beams.

Examples of a compound having a functional group having an activity to electron beam irradiation and having a bicyclo ring structure include dicyclopentenyloxyethyl acrylate (methacrylate), dicyclopentenyl acrylate (methacrylate), dicyclopentanyl acrylate (methacrylate), dicyclopentanyloxyethyl acrylate (methacrylate), adamantyl acrylate (methacrylate), norbornyl acrylate (methacrylate), bornyl acrylate (methacrylate), and isobornyl acrylate (methacrylate).

The mixture may also contain a compound other than the compounds described above. For example, a compound having a heterocyclic structure may be added to the mixture. As a result, the effect of securing the fixation of the proton conducting component formed at the step (2) into the porous polymer film can be expected. The compound having a heterocyclic structure may further have a polymerizable group. Alternatively, to secure the chemical bond between the polymerization products or between the polymerization product and the porous polymer film, a cross-linking promotor may be added in appropriate amounts as a compound other than the compound having a proton conducting group and the compound having a bicyclo ring structure. Such a cross-linking promotor can have an activity to electron beams. Examples of suitable cross-linking promoters include acrylamide, methylenebisacrylamide, acrylonitrile, N-vinylpyrrolidone, and glycerin dimethacrylate. Alternatively, an appropriate solvent may be added in small amounts to the functional compounds for the purpose of adjusting viscosity.

A method for filling the mixture into a hole of the porous polymer film is not particularly limited. For example, the porous polymer film may merely be dipped in a liquid of the mixture. To further enhance contact efficiency, ultrasonic vibration may be added thereto as appropriate. Alternatively, a vacuum filtration or pressure filtration approach may be used together.

Regarding Step (2)

Examples of a method for polymerizing the compounds in the mixture (method for polymerizing the mixture filled in holes so as to form the proton conducting component) include electron beam irradiation, ultraviolet irradiation, and heat polymerization. Among these methods, the electron beam irradiation can be used particularly. The mixture after polymerization can be in a solid or gel form.

The dose of electron beams in electron beam irradiation is not particularly limited. The dose can be set to 100 Gy or higher to 10 MGy or lower, particularly 5 kGy or higher to 200 kGy or lower. A dose lower than 100 Gy does not sufficiently form the chemical bond between the compounds. A dose larger than 10 MGy might denature the polymer membrane or the proton conducting group.

The acceleration voltage of electron beams differs depending on the thickness of the electrolyte membrane. For example, the acceleration voltage can be approximately 50 kV or higher to 2 MV or lower for a film of 15 μm or larger to 150 μm or smaller in thickness. Electron beam irradiation may be performed with plural electron beams differing in acceleration voltage. Alternatively, the acceleration voltage may be changed during electron beam irradiation. Moreover, heat treatment may be performed during or immediately after irradiation with active energy lines, if necessary.

Moreover, the unnecessary mixture sometimes remains on the surface of the membrane after electron beam irradiation. In such a case, the unnecessary mixture may be removed by washing with water.

[Characteristics of Membrane Electrode Assembly and Polymer Electrolyte Fuel Cell of the Present Invention]

FIG. 1 schematically illustrates the general constitution of the polymer electrolyte fuel cell obtained in the present invention. In this context, FIG. 1 illustrates one example of the minimal constitution of the polymer electrolyte fuel cell of the present invention. However, the actual polymer electrolyte fuel cell may have any shape and may include plural membrane electrode assemblys combined in series or in parallel. Moreover, the constitutions and shapes of the membrane electrode assembly and the polymer electrolyte fuel cell of the present invention are not limited to those illustrated in FIG. 1. The diagram illustrates a membrane electrode assembly 1 of the present invention, a polymer electrolyte membrane 101 of the present invention, a catalyst layer 102, a diffusion layer 103, an anode 2, and a cathode 3. In the present invention, a junction including the polymer electrolyte membrane 101, a pair of the catalyst layers 102, and a pair of the diffusion layers 103 is referred to as a membrane electrode assembly.

In the present invention, the catalyst layer 102 may be made of a metal catalyst or may be made of conductive carbon holding a metal catalyst on the surface. Among these substances, the conductive carbon holding a metal catalyst on the surface can be used particularly to form the catalyst layer 102. Platinum-group metals such as platinum, rhodium, ruthenium, iridium, palladium, and osmium can be used as such metal catalysts. Alternatively, an alloy of platinum and the platinum-group metal may be used. Thus, for example, conductive carbon holding platinum as a metal catalyst can be used as a catalyst layer on the anode or cathode side. Alternatively, when methanol is used as a fuel, an alloy of platinum and ruthenium can be used as a catalyst layer on the anode side. In this context, the term "or" described in the present invention and in the present specification is a concept including the term "and". Therefore, the phrase "can be used as a catalyst layer on the anode or cathode side" means that the catalyst layer may be used only as a catalyst layer on the anode side, only as a catalyst layer on the cathode side, and both as a catalyst layer on the anode side and as a catalyst layer on the cathode side.

When the catalyst layer is made of conductive carbon holding a metal catalyst on the surface, the metal catalyst can be in a particle form. Alternatively, when the catalyst layer is made of a metal catalyst, the metal catalyst can be in an anisotropically shaped form such as arboreal and cylindrical forms, in addition to a particle form. It is desired that the average particle size of the metal catalyst should be 0.5 nm or larger to 20 nm or smaller, particularly 1 nm or larger to 10 nm or smaller. The metal catalyst having a particle size smaller than 0.5 nm has too high activity in itself. Therefore, its handling may be difficult. By contrast, the metal catalyst having a particle size exceeding 20 nm has a reduced surface area. Therefore, the activity might be reduced. When the metal catalyst is in a form other than the particle, the particle size is determined as a radius on the assumption that the metal catalyst is a sphere in which the metal catalyst is inscribed.

The conductive carbon can be selected from carbon black, carbon fibers, graphite, carbon nanotubes, and the like. The average particle size of the conductive carbon can be 5 nm or larger to 1000 nm or smaller, particularly 10 nm or larger to 100 nm or smaller. Moreover, the conductive carbon can have a somewhat large specific surface area for holding the metal catalyst. The specific surface area can be 50 $m^2/g$ or larger to 3000 $m^2/g$ or smaller, particularly 100 $m^2/g$ or larger to 2000 $m^2/g$ or smaller.

Methods known in the art can be used widely as methods for holding the catalyst onto the conductive carbon surface. Known methods, as disclosed in, for example, Japanese Patent Application Laid-Open Nos. H2-111440 and 2000-003712, include dipping the conductive carbon into a solution of platinum and other metals, then reducing these noble metal ions, and holding these metal ions onto the conductive carbon surface. These methods can be used in the present invention. Alternatively, noble metals to be held may be held on the conductive carbon by a vacuum film formation method such as sputtering using the noble metals as targets.

A film of the catalyst layer component thus prepared is formed on the surfaces of the polymer electrolyte membrane 101 and/or the diffusion layer 103 to obtain the catalyst layer 102. A method for forming a film of the catalyst layer 102 is not particularly limited. Examples thereof include approaches such as: the application of a paste obtained by mixing the catalyst layer component with electrolyte materials, a water repellent, conductive carbon, and binders such as organic solvents; film formation by a gas phase method; and transfer through another base material.

Examples of the electrolyte materials contained in the paste prepared include fluoro polymers having a proton conducting group (e.g., Nafion (registered trademark), DuPont), sulfonic acid fluoro oligomers, sulfonated polyimide, and sulfonated oligomers.

The electrolyte materials may be added to the catalyst layer after formation of the catalyst layer by film formation by a gas phase method or by transfer.

A method for applying the paste is not particularly limited. Examples thereof include bar coater, spin coating, screen printing, air doctor coater, blade coater, rod coater, knife coater, squeeze coater, dip coater, comma coater, die coater, reverse roll coater, transfer roll coater, gravure coater, kiss roll coater, cast coater, spray coater, curtain coater, calender coater, and extrusion coater methods.

The diffusion layer 103 is a constituent member for evenly introducing fuels and oxidizing agent gases at high efficiency into the catalyst layer 102 and transferring electrons from or to the electrodes through the contact with the electrodes. In general, the diffusion layer 103 can be made of a conducting porous film. For example, carbon papers, carbon cloths, and composite sheets of carbon and polytetrafluoroethylene can be used. The surface and/or the internal region of this diffusion layer 103 may be subjected to water repelling treatment for use by coating with fluorine-based paints.

The thickness of the diffusion layer 103 can be 0.1 μm or larger to 500 μm or smaller. The diffusion layer 103 having a thickness smaller than 0.1 μm results in insufficient gas diffusibility and water repellency. By contrast, the diffusion layer 103 having a thickness larger than 500 μm increases its electric resistance, leading to an increased ohm loss. The thickness of the diffusion layer 103 can be particularly 1 μm or larger to 300 μm or smaller.

The anode 2 and the cathode 3 are electrodes for transferring an electric current generated in the membrane electrode assembly 1 to the outside. It is desired that these electrodes should be made of conducting materials. Moreover, each of the anode 2 and the cathode 3 may also serve as a channel plate for supplying fuels and oxidizing agent gases into the diffusion layer 103. Specifically, the anode 2 and the cathode 3 are not necessarily required to be flat-shaped and may be in a form patterned to an electric current transfer portion and a channel groove.

The polymer electrolyte fuel cell of the present invention may be provided with members such as a gasket for preventing fuels and oxidizing agent gases from leaking out, if necessary, though these members are not illustrated in FIG. 1.

EXAMPLES

Hereinafter, the present invention will be described more specifically with reference to Examples. The present invention is not limited to Examples below and can be modified without deviating from the sprits of the present invention.

Production Example of Polymer Electrolyte Membrane

Example 1

In a plastic container, 32.4 g of vinylsulfonic acid as a compound having a proton conducting group and a polymerizable group, 2.4 g of dicyclopentenyloxyethyl acrylate ("FA-512A" manufactured by Hitachi Chemical Co., Ltd.) as a compound having a bicyclo ring structure and a polymerizable group, and 1.5 g of methylenebisacrylamide as a cross-linking promotor were mixed. Into this mixed solution, a polyimide membrane having a thickness of 28 μm and an average porosity of 45% (in terms of a volume) was dipped as a porous polymer film. The container was subjected to ultrasonic treatment for 1 minute. The polyimide membrane taken out of the container was transferred onto a smooth SUS plate and irradiated with electron beams at an acceleration voltage of 200 kV and a dose of 50 kGy using an electron beam irradiation apparatus (EC250/15/180L manufactured by Iwasaki Electric Co., Ltd.). The mixture in a liquid state filled in holes of the polyimide membrane adhered thereto by electron beam irradiation to obtain a polymer electrolyte membrane PEM-1 of the present Example.

Example 2

The constitution of a mixture was changed to 32.4 g of vinylsulfonic acid as a compound having a proton conducting group and a polymerizable group, 1.9 g of dicyclopentenyl acrylate ("FA-511A" manufactured by Hitachi Chemical Co., Ltd.) as a compound having a bicyclo ring structure and a polymerizable group, and 1.5 g of methylenebisacrylamide as a cross-linking promotor. The other procedures were performed in the same way as in Example 1 to obtain a polymer electrolyte membrane PEM-2 of the present Example.

Example 3

The constitution of a mixture was changed to 32.4 g of vinylsulfonic acid as a compound having a proton conducting group and a polymerizable group, 1.9 g of dicyclopentanyl acrylate ("FA-513A" manufactured by Hitachi Chemical Co., Ltd.) as a compound having a bicyclo ring structure and a polymerizable group, and 2.9 g of glycerin dimethacrylate as a cross-linking promotor. The other procedures were performed in the same way as in Example 1 to obtain a polymer electrolyte membrane PEM-3 of the present Example.

Example 4

The constitution of a mixture was changed to 25.9 g of vinylsulfonic acid as a compound having a proton conducting group and a polymerizable group, 3.2 g of dicyclopentenyloxyethyl methacrylate ("FA-512M" manufactured by Hitachi Chemical Co., Ltd.) as a compound having a bicyclo ring structure and a polymerizable group, and 6.5 g of methacroyloxyethyl phosphate ("P-1M" manufactured by Kyoeisha Chemical Co., Ltd.) as a cross-linking promotor. The other procedures were performed in the same way as in Example 1 to obtain a polymer electrolyte membrane PEM-4 of the present Example.

Example 5

The constitution of a mixture was changed to 28.0 g of vinylsulfonic acid as a compound having a proton conducting group and a polymerizable group, 1.0 g of dicyclopentenyloxyethyl acrylate as a compound having a bicyclo ring structure and a polymerizable group, 1.3 g of methylenebisacrylamide as a cross-linking promotor, and 9.2 g of acryloylmorpholine as an additional compound. The other procedures were performed in the same way as in Example 1 to obtain a polymer electrolyte membrane PEM-5 of the present Example.

Example 6

The constitution of a mixture was changed to 82.8 g of 2-acrylamido-2-methylpropanesulfonic acid as a compound having a proton conducting group and a polymerizable group, 4.1 g of dicyclopentenyloxyethyl acrylate as a compound having a bicyclo ring structure and a polymerizable group, 0.6 g of methylenebisacrylamide as a cross-linking promotor, and 87.7 g of water. Into this mixed solution, 1.1 g of water-soluble azo-based initiator ("V-50" manufactured by Wako Pure Chemical Industries, Ltd.) was added. The same porous polyimide membrane as in Example 1 was dipped in this mixed solution. The container was subjected to ultrasonic treatment for 1 minute. The polyimide membrane taken out of the container was transferred onto a smooth SUS plate and irradiated with visible lights for 6 minutes. Then, the polyimide membrane was heated for 18 hours in an oven set to 50° C. In this way, a polymer electrolyte membrane PEM-6 of the present Example was obtained.

Comparative Example 1

The constitution of a mixture was changed to 32.4 g of vinylsulfonic acid as a compound having a proton conducting group and a polymerizable group and 1.5 g of methylenebisacrylamide as a cross-linking promotor. The other procedures were performed in the same way as in Example 1 to obtain a polymer electrolyte membrane REF-1 for comparison.

Comparative Example 2

The constitution of a mixture was changed to 32.4 g of vinylsulfonic acid as a compound having a proton conducting group and a polymerizable group, 1.5 g of cyclohexyl acrylate as a compound having a polymerizable group instead of using a compound having a bicycle ring structure, and 2.9 g of glycerin dimethacrylate as a cross-linking promotor. The other procedures were performed in the same way as in Example 1 to obtain a polymer electrolyte membrane REF-2 for comparison.

Comparative Example 3

The constitution of a mixture was changed to 82.8 g of 2-acrylamido-2-methylpropanesulfonic acid as a compound having a proton conducting group and a polymerizable group, 0.6 g of methylenebisacrylamide as a cross-linking promotor, and 83.4 g of water. The other procedures were performed in the same way as in Example 6 to obtain a polymer electrolyte membrane REF-3 for comparison.

(Measurement of Filling Factor)

The cross sections of the polymer electrolyte membranes obtained in Examples and Comparative Examples were observed with a scanning electron microscope (10000 times). A value determined by dividing the area of the proton conducting component occupying the observed image by an area except for the area of polyimide is defined as a filling factor. The results thereof are shown in Table 1.

(Measurement of Proton Conductivity)

The polymer electrolyte membranes obtained in Examples and Comparative Examples were separately cut into a piece of 2 mm in width and 3 cm in length. Platinum electrodes provided at 1-cm intervals were allowed to adhere to both sides of the cut piece. The electrodes were connected to an impedance analyzer (SI-1260 manufactured by Solartoron Company). Impedance measurement was conducted at frequencies from 10 MHz to 1 Hz in environments having a temperature of 50° C. and relative humidity of 90%. Conductivity was calculated from the diameter of the semicircle shown by the Cole-Cole plot. The results thereof are shown in Table 1.

(Production Example of Membrane Electrode Assembly)

A paste was prepared as a precursor paste of a conducting substance holding a catalyst on the anode side by sufficiently mixing 1 g of platinum-ruthenium catalyst ("TEC90110" manufactured by Tanaka Kikinzoku Kogyo) and 5 g of 5 wt % Nafion solution (manufactured by Aldrich). A paste was prepared as a precursor paste of a conducting substance holding a catalyst on the cathode side by sufficiently mixing 1 g of platinum catalyst ("AY-1020" manufactured by Tanaka Kikinzoku Kogyo) and 5 g of 5 wt % Nafion solution (manufactured by Aldrich).

These pastes were separately applied at a size of 2 mg/cm$^2$ in terms of the metal catalyst to a carbon paper ("TGP-H-060" manufactured by Toray Industries, Inc., 200 μm in thickness) and dried so as to form catalyst layer-attached diffusion layers.

Each of the polymer electrolyte membranes obtained in Examples and Comparative Examples was sandwiched between the catalyst layer-attached diffusion layer for an anode and the catalyst layer-attached diffusion layer for a cathode and subjected to hot press treatment under conditions of 95° C. and 2 kN to obtain membrane electrode assemblys of the present Examples and for comparison.

(Production Example of Polymer Electrolyte Fuel Cell and Output Measurement)

Each of the membrane electrode assemblys was fitted to a fuel cell (DFC-012 manufactured by Chemix Co., Ltd., an electric cell having a catalyst layer area of 10 cm$^2$) to obtain polymer electrolyte fuel cells of the present Examples and for comparison.

Hydrogen or 10% methanol was supplied as a fuel to the anode of the obtained polymer electrolyte fuel cells, while an air at a normal pressure was supplied to the cathode thereof. Power generation was performed with the whole cell kept at 60° C. Output measurement was performed using a fuel cell test system (890B manufactured by Scribner Associates Inc.) to read out the highest output value at the point in time when the cell was assembled. Furthermore, power generation was practiced with constant electric currents for consecutive 200 hours. Then the highest output value was read out again. For the hydrogen fuel, the operation was performed with constant electric currents at 250 mA/cm$^2$. For the 10% methanol fuel, the operation was performed with constant electric currents at 50 mA/cm$^2$. The initial highest output value and the highest output value after 200-hour operation of each cell are shown in Table 1.

TABLE 1

| | Filling factor (%) | Conductivity (S/cm) | Hydrogen initial (mW/cm$^2$) | Hydrogen after 200-hour operation (mW/cm$^2$) | Methanol initial (mW/cm$^2$) | Methanol after 200-hour operation (mW/cm$^2$) |
|---|---|---|---|---|---|---|
| Example 1 | 99 | 1.2E−1 | 260 | 260 | 70 | 69 |
| Example 2 | 97 | 1.0E−1 | 253 | 247 | 65 | 65 |
| Example 3 | 97 | 1.0E−1 | 244 | 243 | 63 | 63 |
| Example 4 | 96 | 1.0E−1 | 230 | 225 | 60 | 58 |
| Example 5 | 98 | 1.9E−1 | 345 | 340 | 82 | 80 |
| Example 6 | 82 | 4.4E−2 | 190 | 179 | 55 | 50 |
| Comparative Example 1 | 74 | 3.5E−2 | 170 | 96 | 51 | 31 |
| Comparative Example 2 | 70 | 2.0E−2 | 170 | 127 | 47 | 38 |
| Comparative Example 3 | 55 | 9.5E−3 | 165 | 105 | 40 | 25 |

The polymer electrolyte membranes of Examples exhibited a higher filling factor and proton conductivity than those of Comparative Examples. This is probably because the presence of the bicyclo ring structure improves the wettability of the porous polymer film with the mixed solution. Moreover, the polymer electrolyte fuel cells of Examples had an excellent output and hardly produced deterioration in performance even after 200-hour operation. This is probably attributed to a high filling factor and fixation strength of the proton conducting component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-306958, filed Nov. 13, 2006, which is hereby incorporated by reference herein in its entirety.

The invention claimed is:

1. A polymer electrolyte membrane comprising a porous polymer film and a proton conducting component present in a hole of the porous polymer film, wherein the proton conducting component comprises a compound having a proton conducting group and a bicyclo ring structure, and wherein the bicyclo ring structure is a dicyclopentenyl group or a dicyclopentanyl group.

2. The polymer electrolyte membrane according to claim 1, wherein the compound is a copolymer of a compound having a bicyclo ring structure and a compound having a proton conducting group.

3. The polymer electrolyte membrane according to claim 1, wherein the proton conducting group is a sulfonic acid group and/or a phosphoric acid group.

4. The polymer electrolyte membrane according to claim 1, wherein the compound having a proton conducting group and a bicyclo ring structure also has a heterocyclic structure.

5. The polymer electrolyte membrane according to claim 4, wherein the heterocyclic structure is a morpholine ring structure.

6. The polymer electrolyte membrane according to claim 1, wherein the porous polymer film is a membrane comprising a polyimide-based polymer.

7. A membrane electrode assembly comprising a polymer electrolyte membrane according to claim 1 and an electrode.

8. A polymer electrolyte fuel cell comprising a membrane electrode assembly according to claim 7 and an electrode for transferring an electric current generated in the membrane electrode assembly to the outside.

9. A method for producing a polymer electrolyte membrane, comprising:
    filling a mixture of a compound having a proton conducting group and a compound having a bicyclo ring structure into a hole of a porous polymer film; and
    polymerizing the compound having a proton conducting group and the compound having a bicyclo ring structure, wherein the bicyclo ring structure is a dicyclopentenyl group or a dicyclopentanyl group.

10. The method for producing a polymer electrolyte membrane according to claim 9, wherein each of the compound having a proton conducting group and the compound having a bicyclo ring structure has a polymerizable group.

11. The method for producing a polymer electrolyte membrane according to claim 9, wherein the polymerization is performed by electron beam irradiation.

* * * * *